(12) United States Patent
Chang (10) Patent No.: US 9,772,631 B1
(45) Date of Patent: Sep. 26, 2017

(54) WATER CONTROL VALVE

(71) Applicant: Chia-Po Chang, Changhua (TW)

(72) Inventor: Chia-Po Chang, Changhua (TW)

(73) Assignee: Hain Yo Enterprises Co. Ltd., Changhua (TW)

( * ) Notice: Subject to any disclaimer, the term of this patent is extended or adjusted under 35 U.S.C. 154(b) by 0 days.

(21) Appl. No.: 15/346,017

(22) Filed: Nov. 8, 2016

(51) Int. Cl.
| | |
|---|---|
| *E03B 1/00* | (2006.01) |
| *G05D 16/10* | (2006.01) |
| *F16K 11/10* | (2006.01) |
| *F16K 15/02* | (2006.01) |
| *G05D 23/13* | (2006.01) |

(52) U.S. Cl.
CPC .......... *G05D 16/106* (2013.01); *F16K 11/105* (2013.01); *F16K 15/026* (2013.01); *G05D 23/1313* (2013.01)

(58) Field of Classification Search
CPC ............. G05D 16/106; G05D 23/1313; G05D 23/136; F16K 17/26; F16K 19/006; Y10T 137/86823
USPC ....... 137/98, 100, 603, 605, 606, 625.4, 896
See application file for complete search history.

(56) References Cited

U.S. PATENT DOCUMENTS

| | | | | |
|---|---|---|---|---|
| 4,397,330 A * | 8/1983 | Hayman | ............. | F16K 11/0746 137/270 |
| 4,978,059 A * | 12/1990 | Nicklas | ............. | G05D 23/1353 137/625.44 |
| 5,067,513 A * | 11/1991 | Nicklas | ............. | G05D 23/1353 137/454.6 |
| 5,355,906 A * | 10/1994 | Marty | ................. | F16K 11/0743 137/454.6 |
| 7,918,241 B1 * | 4/2011 | Chang | ................... | F16K 11/074 137/315.09 |
| 8,118,057 B2 * | 2/2012 | Deutsch | ............. | F16K 11/0743 137/625.4 |
| 8,656,954 B2 * | 2/2014 | Deutsch | ............. | F16K 11/0743 137/625.4 |
| 8,931,706 B2 * | 1/2015 | Lin | ..................... | G05D 23/1353 236/12.1 |
| 2013/0042923 A1 * | 2/2013 | Yan | ............................ | F15D 1/04 137/100 |
| 2013/0312856 A1 * | 11/2013 | Huffington | .............. | F16K 37/00 137/557 |

* cited by examiner

*Primary Examiner* — Reinaldo Sanchez-Medina
(74) *Attorney, Agent, or Firm* — Che-Yang Chen; Law Offices of Scott Warmuth (57) ABSTRACT

A water control valve may comprise a balancing valve installed therein, and the balancing valve has two corresponding housing members which are configured to connect to each other to secure a locating tube and a movable valve core therein. Each of the housing members has a water inlet, and two non-return devices are respectively installed in the two water inlets. With the non-return device and the balancing valve, the water control valve is configured to balance the water pressure between cold and hot water inflows and prevent backflow simultaneously, thus ensuring the water quality.

3 Claims, 8 Drawing Sheets

WATER CONTROL VALVE

FIELD OF THE INVENTION

The present invention relates to a water control valve more particularly to a water control valve capable of balancing water pressure between hot and cold water inflows and preventing backflow.

BACKGROUND OF THE INVENTION

A conventional control valve of a faucet usually has a balancing valve which is installed therein to stabilize water pressure when water flowing through the control valve. Generally, the balancing valve comprises a locating tube and a movable valve core coupled with each other and covered by two connected housing members, and a body of the locating tube has an O-ring disposed thereon. Also, each of two lateral sides of the locating tube has an opening. Each of two ends of the valve core comprises a compartment, and the two compartments are separated by a partition. Moreover, each of the two compartments has a peripheral recess which is formed at an outer peripheral thereof and configured to allow the valve core to move forward or backward to change the relative positions between the valve core and each of the peripheral recesses of the locating tube when water pressure in the control valve is changed during hot and cold water flowing through, thereby balancing water temperature flowing out of the faucet.

However, the conventional control valve is disadvantageous because: the balancing valve only can balance the water pressure between hot water inflow and cold water inflow, and it cannot provide non-return effect, so that a mixed water may flow back to a cold water inlet channel or a hot water inlet channel, thus reducing the water quality. Therefore, there remains a need for a new and improved design for a water control valve to overcome the problems presented above.

SUMMARY OF THE INVENTION

The present invention provides a water control valve such as a ceramic control valve, which comprises a balancing valve installed therein. The balancing valve has two corresponding housing members which are configured to connect to each other to secure a locating tube and a movable valve core therein. Each of the housing members has a water inlet, and the two water inlets are respectively for hot water inflow and cold water inflow. Two non-return devices respectively installed in the two water inlets are configured to balance water pressure and prevent backflow, and each of the two non-return devices comprises a fixing base, a spring and a blocking unit. Each of the housing members has a passage horizontally penetrating therethrough, and the water inlet and a water outlet respectively penetrating through the housing member are communicated with the passage. The water inlet has a peripheral edge which protrudes from the housing member, and a housing chamber formed inside the peripheral edge is configured to receive the non-return device. The two housing members are connected to each other to allow the two passages to be aligned such that the locating tube with the valve core is secured inside the two passages and the valve core is configured to have relative motions on the locating tube. At least a sealing ring is disposed on an outer periphery of the locating tube, and two first opening formed at the outer periphery of the locating tube are respectively located close to two ends of the locating tube. Two axial compartments respectively formed at two ends of the valve core are separated by a partition, and each of the compartments has a second opening formed at an outer periphery thereof. Thus, when cold and hot water respectively flow from the two water inlets into the balancing valve, the valve core is configured to move on the locating tube to change the relative position between the second openings of the valve core and the first openings of the locating tube, thus balancing the water pressure in the balancing valve. The fixing base has a first annular body and a second annular body, and an inner diameter of the second annular body is smaller than the first annular body. A water inlet channel is formed inside the second annular body, and at least an O-ring is disposed on an outer periphery of the second annular body. A top end of the first annular body is connected to a supporting unit which comprises an interior space, and a plurality of water outlet channels penetrate through an outer periphery of the supporting unit. A top portion of the supporting unit has a through hole axially penetrating through a central portion thereof to communicate with the interior space. The blocking unit has a sealing seat, and a guiding rod protrudes from a top portion thereof. The spring and the blocking unit are sequentially positioned into the interior space of the first annular body, and the guiding rod is configured to penetrate through the through hole of the supporting unit. Also, the second annular body is connected to a bottom portion of the first annular body. Since the spring is borne against the supporting unit and the sealing seat at two ends thereof, the blocking unit is configured to bear against the second annular body to allow the sealing seat to block the water inlet channel. The non-return device is settled in the housing chamber of the housing member to bear the O-ring, which is disposed on the second annular body, against the peripheral edge.

Comparing with conventional water control valve, the present invention is advantageous because: with the non-return device and the balancing valve, the water control valve is configured to balance the water pressure between cold and hot water inflows and prevent backflow simultaneously, thus ensuring the water quality.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 6, the present invention provides a water control valve (10) such as a ceramic control valve, which comprises a balancing valve (20) installed therein. The balancing valve (20) has two corresponding housing members (21) which are configured to connect to each other to secure a locating tube (22) and a movable valve core (23) therein. Each of the housing members (21) has a water inlet (212), and the two water inlets (212) are respectively for hot water inflow and cold water inflow. Two non-return devices (30) respectively installed in the two water inlets (212) are configured to balance water pressure and prevent backflow, and each of the two non-return devices (30) comprises a fixing base (31), a spring (32) and a blocking unit (33). Each of the housing members (21) has a passage (211) horizontally penetrating therethrough, and the water inlet (212) and a water outlet (213) respectively penetrating through the housing member (21) are communicated with the passage (211). The water inlet (212) has a peripheral edge (214) which protrudes from the housing member (21), and a housing chamber (215) formed inside the peripheral edge (214) is configured to receive the non-return device (30). The two housing members (21) are connected to each other to allow the two passages (211) to be aligned such that the locating tube (22) with the valve core (23) is secured inside the two passages (211) and the valve core (23) is configured to have relative motions on the locating tube (22). At least a sealing ring is disposed on an outer periphery of the locating tube (22), and two first opening (221) formed at the outer periphery of the locating tube (22) are respectively located close to two ends of the locating tube (22). Two axial compartments (231) respectively formed at two ends of the valve core (23) are separated by a partition (232), and each of the compartments (231) has a second opening (233) formed at an outer periphery thereof. Thus, when cold and hot water respectively flow from the two water inlets (212) into the balancing valve (20), the valve core (23) is configured to move on the locating tube (22) to change the relative position between the second openings (233) of the valve core (23) and the first openings (221) and of the locating tube (22), thus balancing the water pressure in the balancing valve (20). The fixing base (31) has a first annular body (311) and a second annular body (312), and an inner diameter of the second annular body (312) is smaller than the first annular body (311). A water inlet channel (313) is formed inside the second annular body (312), and at least an O-ring (314) is disposed on an outer periphery of the second annular body (312). A top end of the first annular body (311) is connected to a supporting unit (315) which comprises an interior space, and a plurality of water outlet channels (316) penetrate through an outer periphery of the supporting unit (315). A top portion of the supporting unit (315) has a through hole (317) axially penetrating through a central portion thereof to communicate with the interior space. The blocking unit (33) has a sealing seat (331), and a guiding rod (332) protrudes from a top portion thereof. The spring (32) and the blocking unit (33) are sequentially positioned into the interior space of the first annular body (311), and the guiding rod (332) is configured to penetrate through the through hole (317) of the supporting unit (315). Also, the second annular body (312) is connected to a bottom portion of the first annular body (311). Since the spring (32) is borne against the supporting unit (315) and the sealing seat (331) at two ends thereof, the blocking unit (33) is configured to bear against the second annular body (312) to allow the sealing seat (331) to block the water inlet channel (313). The non-return device (30) is settled in the housing chamber (215) of the housing member (21) to bear the O-ring (314), which is disposed on the second annular body (312), against the peripheral edge (214).

Figure 1:
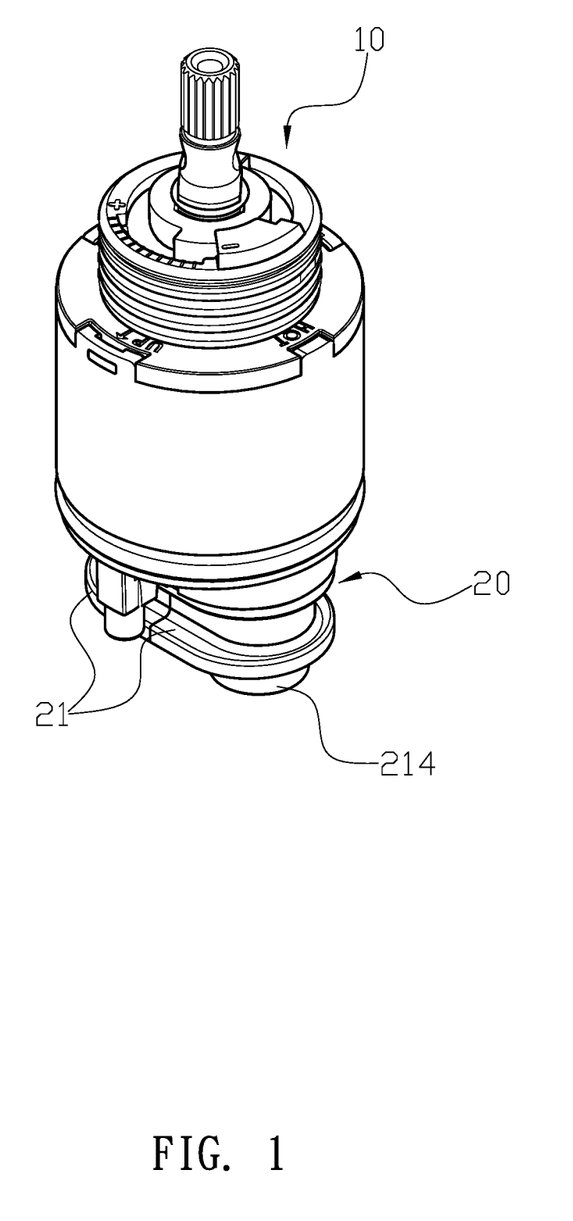
FIG. 1 is a three-dimensional assembly view of a water control valve of the present invention.
Figure 2:
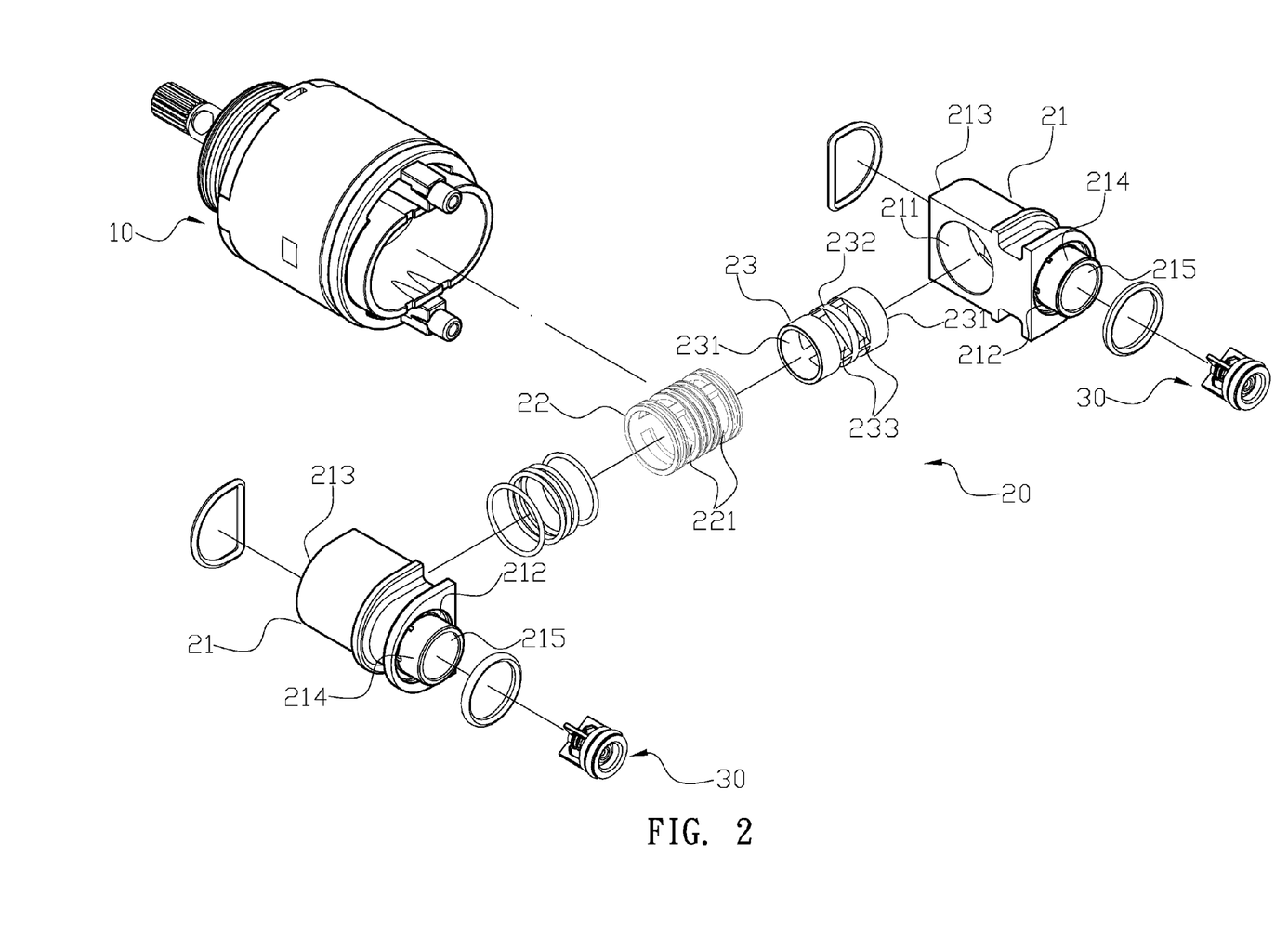
FIG. 2 is a three-dimensional exploded view of the water control valve of the present invention.
Figure 3:
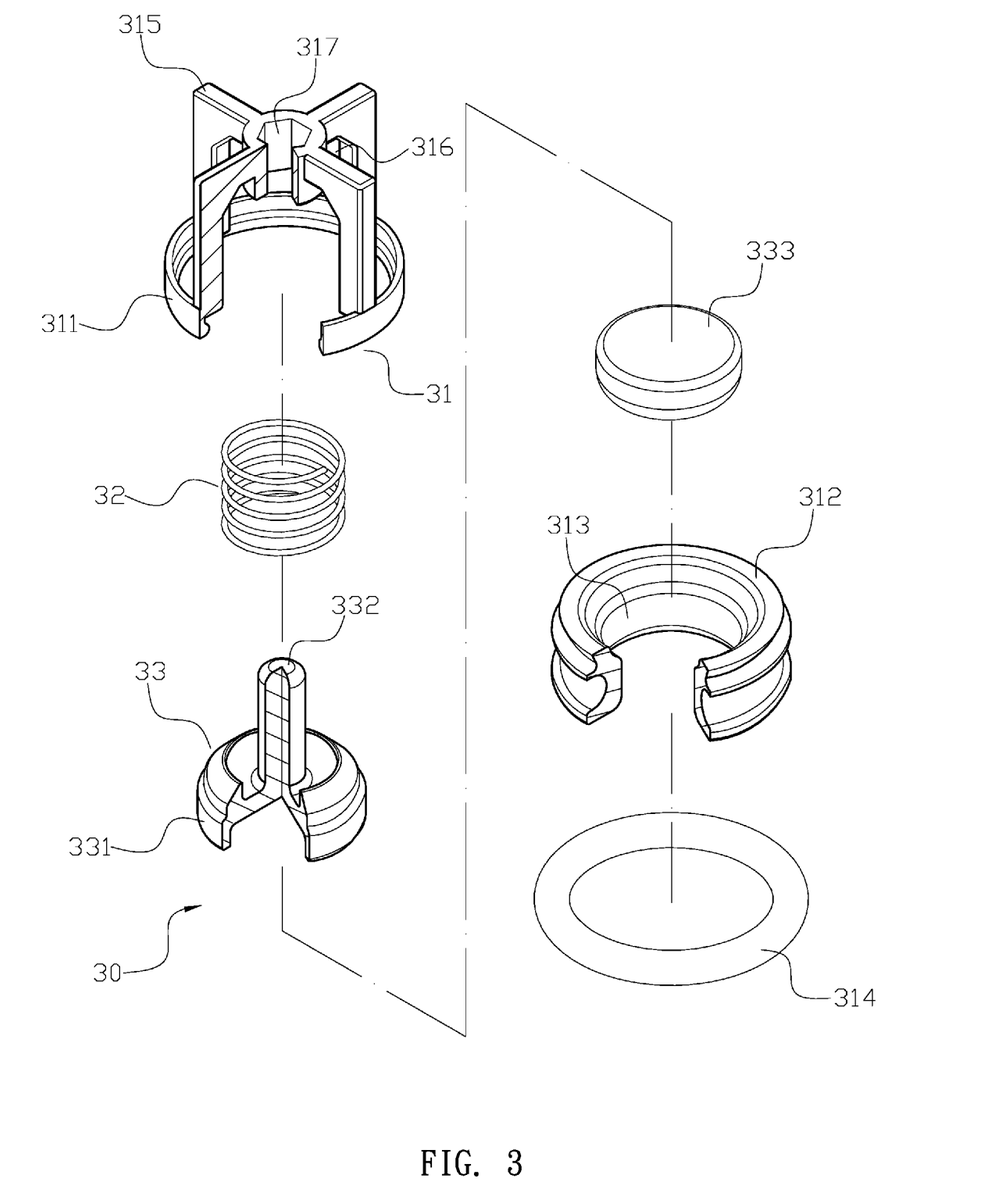
FIG. 3 is a detailed exploded view of a non-return device of the water control valve of the present invention.

In one embodiment, the first annular body (311) is engaged with the second annular body (312).

In another embodiment, a cushion (333) is secured on a bottom end of the sealing seat (331).

Figure 4:
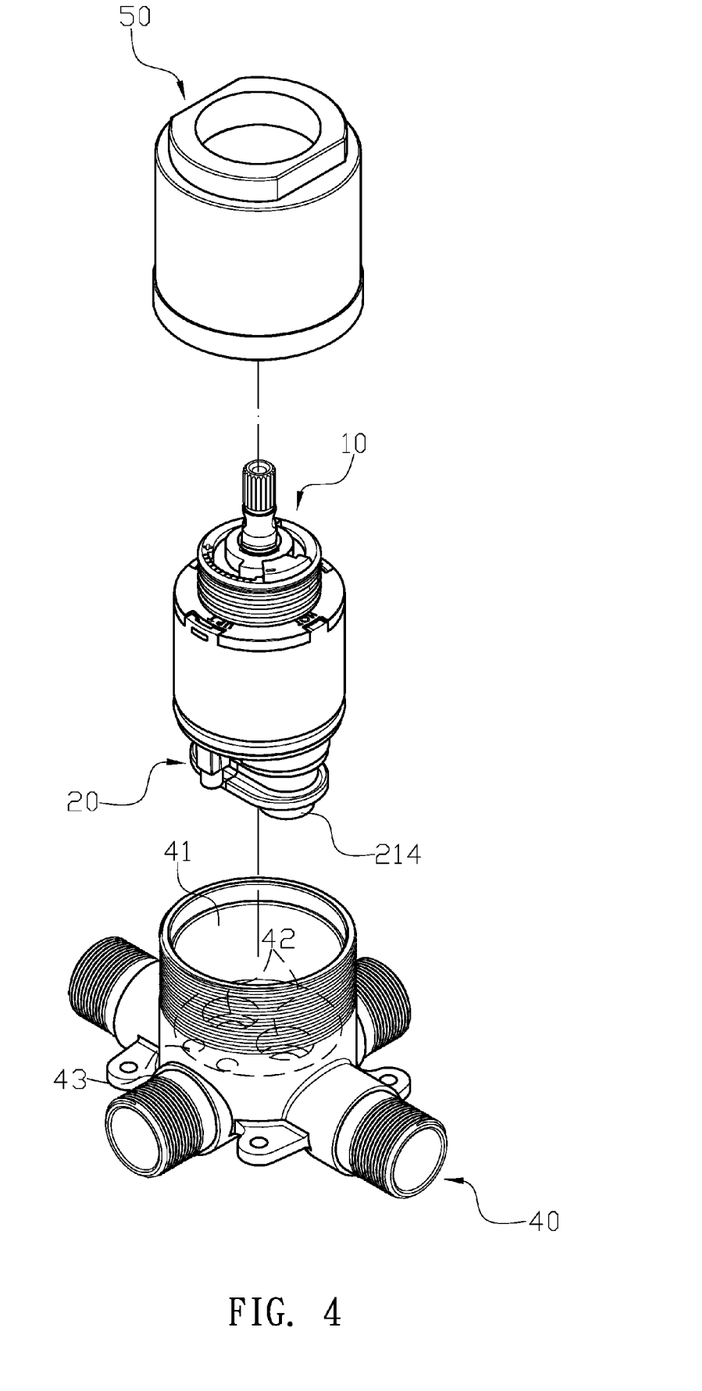
FIG. 4 is a three-dimensional schematic view of the water control valve of the present invention before installed between a shell and a faucet body.
Figure 5:
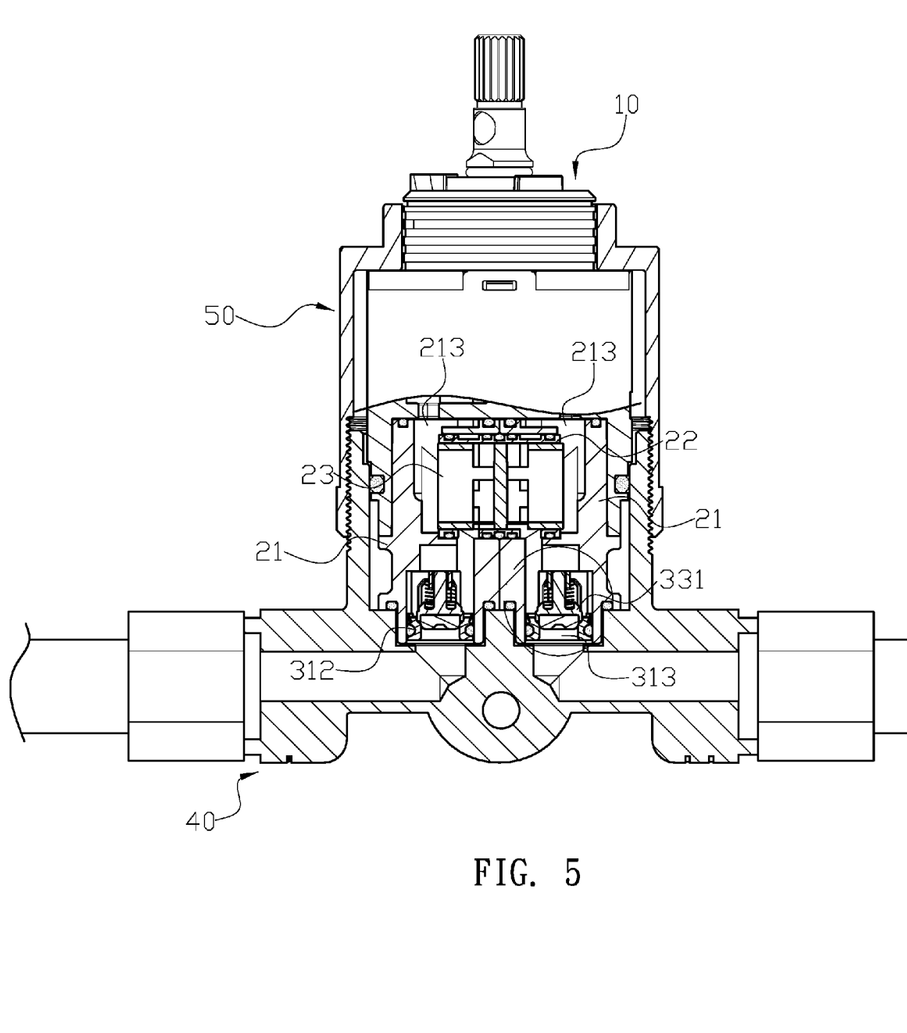
FIG. 5 is a sectional view illustrating the water control valve of the present invention is secured between the shell and the faucet body.
Figure 6:
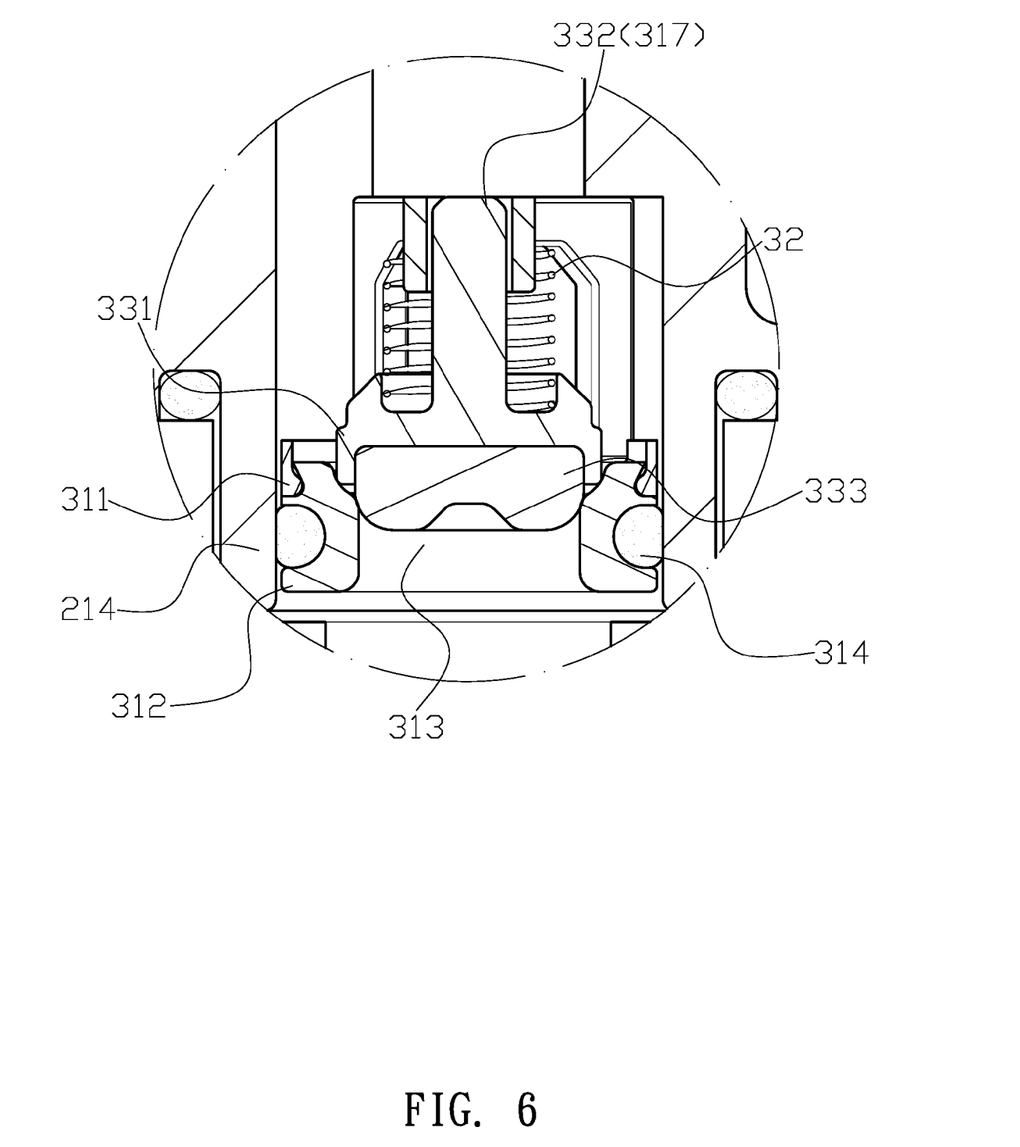
FIG. 6 is a partially enlarged view of FIG. 5.

In still another embodiment, the water control valve (10) is installed in a valve chamber (41) of a faucet body (40), and two water inlet holes (42) penetrating through a bottom portion of the valve chamber (41) are respectively connected to the two peripheral edges (214) of the two housing members (21) for flowing hot water and cold water. Moreover, the bottom portion of the valve chamber (41) comprises at least a water outlet hole (43) for flowing hot, cold or mixed water out of the faucet body (40). A shell (50) covers on the faucet body (40) to allow the water control valve (10) is secured between the faucet body (40) and the shell (50).

Figure 7:
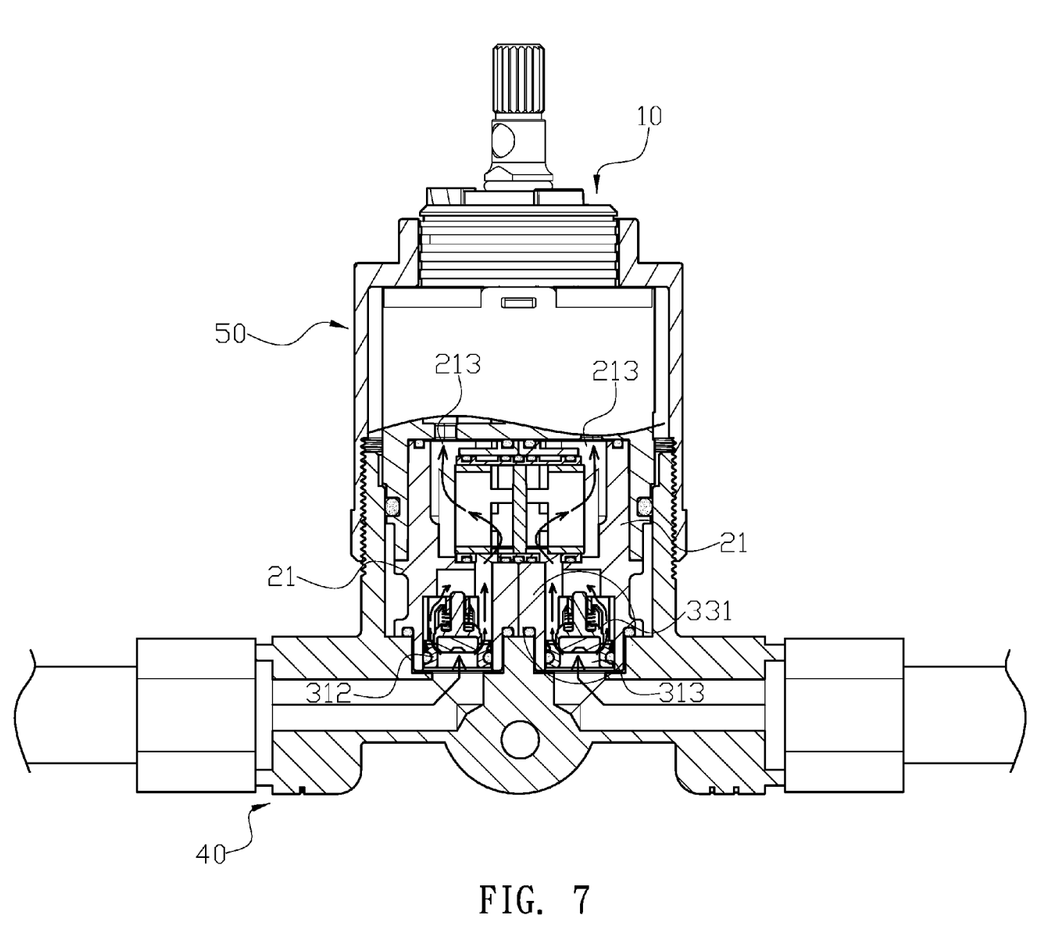
FIG. 7 is a schematic view illustrating water flowing in the water control valve of the present invention is configured to flow in only one direction.
Figure 8:
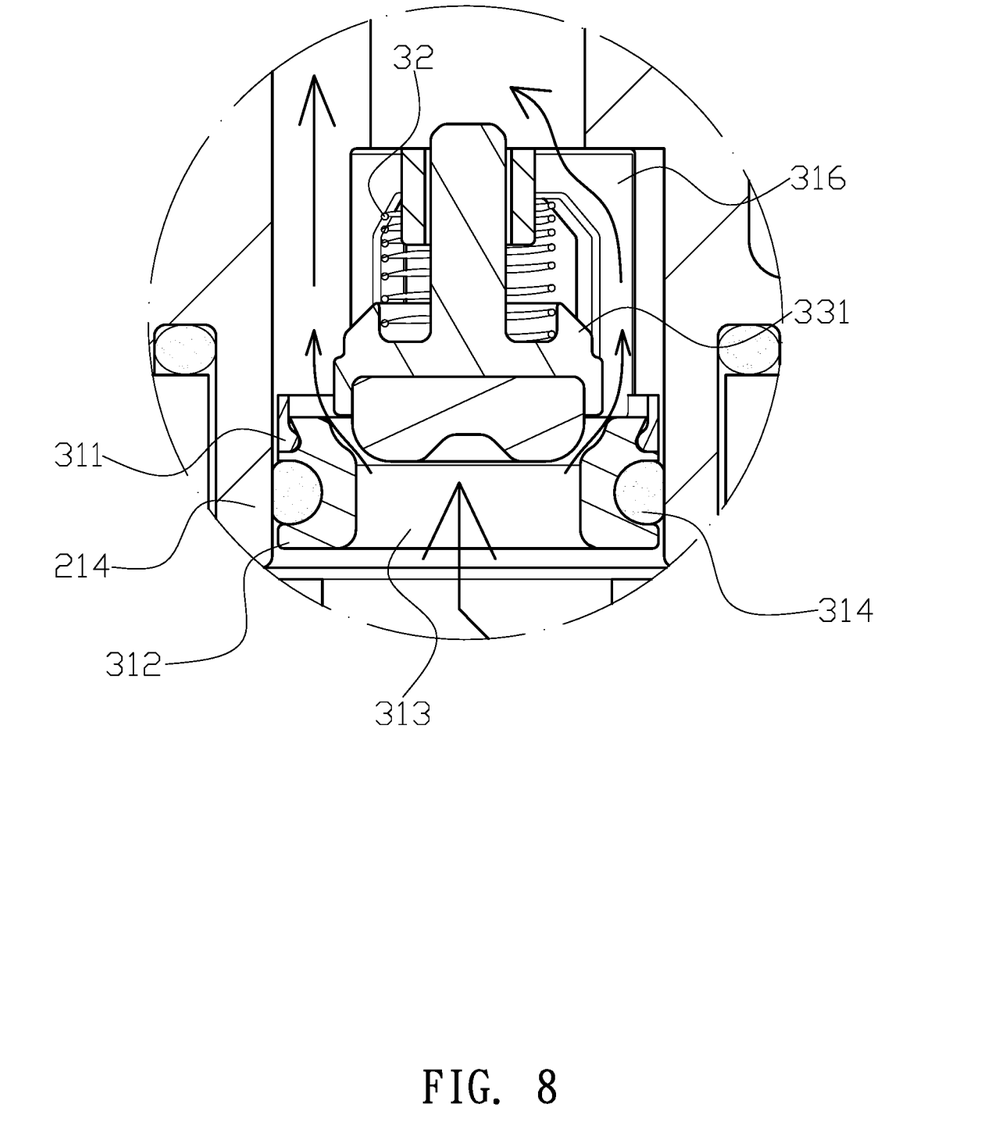
FIG. 8 is a partially enlarged view of FIG. 7.

In actual application, cold and hot water respectively flow through the two water inlets (212) and the housing chambers (215) into the non-return devices (30). Because of the pressure of water inflows, the two sealing seats (331) are pushed upwardly to move away from the two water inlet channels (313) (as shown in FIGS. 7 and 8) such that cold and hot water are configured to respectively flow through the two water inlet channels (313) and the two water outlet channels (316) into the balancing valve (20) which is configured to balance the pressures between cold and hot water inflows. After that, the cold and hot water inflows respectively flow through the two water outlets (213) of the housing member (21), the water control valve (10), and flow out of the faucet body (40). When the pressure caused by water inflows is smaller than a pre-set elastic coefficient of the spring (32), the spring (32) is configured to push the blocking unit (33) back to its initial position such that the sealing seat (331) of the blocking unit (33) is configured to block the water inlet channel (313) of the second annular body (312), thus achieving the non-return effect.

Comparing with conventional water control valve, the present invention is advantageous because: with the non-return device (30) and the balancing valve (20), the water control valve (10) is configured to balance the water pressure between cold and hot water inflows and prevent backflow simultaneously, thus ensuring the water quality.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A water control valve comprising:
   a balancing valve, which is installed in the water control valve, having two corresponding housing members which are configured to connect to each other to secure a locating tube and a movable valve core therein; each of the housing members having a water inlet, and the two water inlets respectively used for hot water inflow and cold water inflow; two non-return devices, which are respectively installed in the two water inlets, configured to balance water pressure and prevent backflow, and each of the two non-return devices comprising a fixing base, a spring and a blocking unit;
   wherein each of the housing members further has a passage horizontally penetrating therethrough, and the water inlet and a water outlet respectively penetrating through the housing member are communicated with the passage; the water inlet has a peripheral edge which protrudes from the housing member, and a housing chamber formed inside the peripheral edge is configured to receive the non-return device; the two housing members are connected to each other to allow the two passages to be aligned such that the locating tube with the valve core is secured inside the two passages and the valve core is configured to have relative motions on the locating tube;
   wherein at least a sealing ring is disposed on an outer periphery of the locating tube, and two first opening formed at the outer periphery of the locating tube are respectively located adjacent to two ends of the locating tube;
   wherein two axial compartments respectively formed at two ends of the valve core are separated by a partition, and each of the compartments has a second opening formed at an outer periphery thereof;
   wherein the fixing base has a first annular body and a second annular body, and an inner diameter of the second annular body is smaller than the first annular body, and a water inlet channel is formed inside the second annular body, and at least an O-ring is disposed on an outer periphery of the second annular body; a top end of the first annular body is connected to a supporting unit which comprises an interior space, and a plurality of water outlet channels penetrate through an outer periphery of the supporting unit; a top portion of the supporting unit has a through hole axially penetrating through a central portion thereof to communicate with the interior space; and
   wherein the blocking unit has a sealing seat, and a guiding rod protrudes from a top portion thereof; the spring and the blocking unit are sequentially positioned into the interior space of the first annular body, and the guiding rod is configured to penetrate through the through hole of the supporting unit; the second annular body is connected to a bottom portion of the first annular body; the spring is borne against the supporting unit and the sealing seat at two ends thereof such that the blocking unit is configured to bear against the second annular body to allow the sealing seat to block the water inlet channel; the non-return device is settled in the housing chamber of the housing member to bear the O-ring, which is disposed on the second annular body, against the peripheral edge.

2. The water control valve of claim 1, wherein the first annular body is engaged with the second annular body.

3. The water control valve of claim 1, wherein a cushion is secured on a bottom end of the sealing seat.

* * * * *